(12) United States Patent
Wipraechtiger et al.

(10) Patent No.: US 12,344,414 B2
(45) Date of Patent: Jul. 1, 2025

(54) MANUFACTURING LINE FOR MANUFACTURING A COMPOSTABLE POD FOR BREWING PRODUCTS AND SYSTEM FOR MEASURING AND REGULATING THE RELATIVE HUMIDITY OF A BIODEGRADABLE PAPER-BASED MATERIAL

(71) Applicant: SOCIETE DES PRODUITS NESTLE S.A., Vevey (CH)

(72) Inventors: Hans Wipraechtiger, Hergiswil (CH); Karim Missoum, Pusignan (FR)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/293,241

(22) PCT Filed: Jul. 27, 2022

(86) PCT No.: PCT/EP2022/071016
§ 371 (c)(1),
(2) Date: Jan. 29, 2024

(87) PCT Pub. No.: WO2023/006791
PCT Pub. Date: Feb. 2, 2023

(65) Prior Publication Data
US 2024/0336382 A1      Oct. 10, 2024

(30) Foreign Application Priority Data

Jul. 30, 2021   (EP) ..................... 21188641

(51) Int. Cl.
*B65B 29/02*   (2006.01)
*B65B 9/04*    (2006.01)
(Continued)

(52) U.S. Cl.
CPC ............... *B65B 29/02* (2013.01); *B65B 9/04* (2013.01); *B65B 57/08* (2013.01); *B65B 61/06* (2013.01)

(58) Field of Classification Search
CPC  B65B 9/04; B65B 9/042; B65B 9/045; B65B 29/02; B65B 29/022; B65B 1/30; B65B 57/08; B65B 61/06
See application file for complete search history.

(56) References Cited

U.S. PATENT DOCUMENTS 3,851,441 A  * 12/1974  Marchand ............... B65B 9/042
                                                53/239
4,257,530 A  *  3/1981  Faller ........................ B65B 9/04
                                                229/905
(Continued)

FOREIGN PATENT DOCUMENTS

| CN | 210311195 | 4/2020 |
|---|---|---|
| KR | 101480713 | 1/2015 |
| WO | 2020031096 | 2/2020 |

*Primary Examiner* — Dariush Seif
(74) *Attorney, Agent, or Firm* — K&L Gates LLP

(57) ABSTRACT

The invention concerns a manufacturing line (1) for manufacturing a compostable pod (5) for brewing products (5a), said pod (5) being made of two complementary portions (4a, 4b, 6). The manufacturing line (1) comprises at least one shaping line (2) for shaping the complementary portions (4a, 4b, 6), the shaping line (2) comprising: —a handling unit (7) for handling the sheet (3) of biodegradable paper-based material with gas barrier biodegradable polymer; —a humidifying unit (8) for moistening at least one side of the sheet (3) of biodegradable paper-based material; —an optional pre-drying unit (17) for drying, at least partially, the at least one side of the sheet (3) of biodegradable paper-based material; —a forming unit (8) for shaping the sheet (3) of biodegradable paper-based material into one of the
(Continued)

complementary portions (4a, 4b, 6); and—a drying unit (10) for drying the at least one side of the sheet (3) of biodegradable paper-based material forming one of the complementary portions (4a, 4b, 6); According to the invention, the shaping line (2) comprises at least one humidity sensor (S1, S2, S3, S4) for sensing the level of relative humidity of the biodegradable paper-based material forming the pod (5) said at least one humidity sensor (S1, S2, S3, S4) being positioned before or after at least said one of the handling unit (7), the humidifying unit (8), the optional pre-drying unit (17), the forming unit (9) and the drying unit (10). The invention further comprises a system for measuring and regulation the relative humidity of the biodegradable paper-based material forming the complementary portions (4a, 4b, 6) of the pod (5). Additionally, the invention relates to a manufacturing process comprising the steps of measuring the relative humidity of at least one side of the sheet (3) of biodegradable paper-based material forming one of the complementary portions (4a, 4b, 6) of the pod (5) and regulating different steps of this process according the relative humidity measured in one or more of the shaping steps.

19 Claims, 3 Drawing Sheets

(51) Int. Cl.
  *B65B 57/08* (2006.01)
  *B65B 61/06* (2006.01)

(56) References Cited

U.S. PATENT DOCUMENTS

| | | | |
|---|---|---|---|
| 4,437,294 A * | 3/1984 | Romagnoli | B65B 1/366 53/553 |
| 5,682,733 A * | 11/1997 | Perrone | B65B 9/04 53/553 |
| 9,039,589 B2 * | 5/2015 | Rivera | B65B 29/025 493/143 |
| 9,616,381 B2 * | 4/2017 | Glorioso | G06K 19/0717 |
| 10,161,895 B2 * | 12/2018 | Bommarito | G01N 27/225 |
| 2003/0009879 A1 * | 1/2003 | Draisey | B29C 66/8242 29/831 |
| 2003/0014945 A1 * | 1/2003 | Danby | B65B 37/20 53/558 |
| 2006/0174693 A1 * | 8/2006 | Chen | A61F 13/42 340/602 |
| 2013/0323453 A1 * | 12/2013 | Hirasawa | D21H 27/005 53/430 |
| 2015/0290926 A1 * | 10/2015 | Branca | B41F 5/24 101/212 |
| 2015/0291300 A1 * | 10/2015 | Brandt Sanz | B65B 41/16 53/64 |
| 2015/0336691 A1 * | 11/2015 | Fowler | B65D 65/46 53/553 |
| 2015/0336692 A1 * | 11/2015 | Brandt Sanz | C11D 17/042 53/450 |
| 2016/0068285 A1 * | 3/2016 | Fowler | B65D 65/46 53/558 |
| 2016/0114914 A1 * | 4/2016 | Kepinski | B65B 41/12 53/436 |
| 2016/0340068 A1 * | 11/2016 | Brandt Sanz | C11D 17/042 |
| 2016/0347483 A1 * | 12/2016 | Rea | B65B 1/04 |
| 2017/0073095 A1 * | 3/2017 | Kobayashi | B65B 13/187 |
| 2017/0088298 A1 * | 3/2017 | McLenithan | B65B 61/06 |
| 2017/0144785 A1 * | 5/2017 | Bartoli | B65B 29/02 |
| 2017/0368580 A1 * | 12/2017 | Brandt Sanz | B65B 47/02 |
| 2018/0290774 A1 * | 10/2018 | Fowler | B65B 9/042 |
| 2018/0362193 A1 * | 12/2018 | Howell, II | C11D 17/042 |
| 2019/0225359 A1 * | 7/2019 | Spindler | B65B 21/245 |
| 2020/0023605 A1 * | 1/2020 | Aoki | B31B 50/22 |
| 2020/0165019 A1 * | 5/2020 | Binacchi | B29C 66/849 |
| 2023/0174256 A1 * | 6/2023 | Brandt Sanz | B65B 9/023 53/434 |
| 2023/0202746 A1 * | 6/2023 | Sandherr | C08K 3/34 99/295 |
| 2024/0043200 A1 * | 2/2024 | Risser | B65B 35/50 |
| 2024/0158113 A1 * | 5/2024 | Brandt Sanz | B65B 61/02 |
| 2024/0199252 A1 * | 6/2024 | Centorame | B65B 1/30 |
| 2024/0253321 A1 * | 8/2024 | Galaffu | B65B 57/08 |
| 2024/0336382 A1 * | 10/2024 | Wipraechtiger | B65B 61/06 |

* cited by examiner

_US 12,344,414 B2_

MANUFACTURING LINE FOR MANUFACTURING A COMPOSTABLE POD FOR BREWING PRODUCTS AND SYSTEM FOR MEASURING AND REGULATING THE RELATIVE HUMIDITY OF A BIODEGRADABLE PAPER-BASED MATERIAL

CROSS REFERENCE TO RELATED APPLICATIONS

The present application is a National Stage of International Application No. PCT/EP2022/071016, filed on Jul. 27, 2022, which claims priority to European Patent Application No. 21188641.1, filed on Jul. 30, 2021, the entire contents of which are being incorporated herein by reference.

FIELD OF THE INVENTION

The present invention relates to a device for manufacturing a compostable pod for brewing products, comprising a humidity sensor, and to a humidity measuring and regulation system for such device.

The invention is further related to the corresponding method of manufacturing a compostable pod for brewing products using said device and to the use of said manufactured compostable pod.

The present invention is particularly applicable in the food and beverage industry and, more particularly, in the technical field of manufacturing pods for brewing products, such as coffee, tea, and the like, adapted for the preparation of a beverage in a beverage preparation apparatus.

BACKGROUND

In recent years, in the field of brewing products, packaging solutions such as capsules and pods have become increasingly popular and are particularly adapted for brewing into a beverage preparation apparatus such as a coffee machine for in-home or professional use. These capsules and pods are storing individual portion of brewing products and protecting them from the ambient air and from mechanical or physical constraints. The preparation of a beverage is then easy, and the time required to prepare a beverage is reduced. Additionally, the proposed storage in capsules and pods allows to get high quality beverages.

Coffee pods are known in the prior art and are currently widely used. Document WO2006/057022 A1 and WO 2014/007639 A1 both describe coffee pods used in coffee machines.

These pods are generally made of paper as presented for example in document WO 2005/092741 A1.

However, it is now preferable to provide packages which are at least biodegradable, and/or even possibly compostable. Biodegradable paper or fiber-based materials are becoming of particular interest.

In addition to the above requirement, the pods should also be airtight to protect the coffee from contact with air that would cause quick oxidation and loss of aromas. To this end, pods are made, for example, of barrier paper-based material, often laminated or coated to protect against moisture and/or oxidizing.

It appears that traditional manufacturing methods, which usually comprise an embossing or thermoforming step of one of the sheets forming the pod, are not fully satisfying for the manufacturing of such paper-based pods. For example, pleats often appear around stamped portions of the paper sheets.

A solution proposing to moisturize the sheet of biodegradable material to improve forming of the pod is presented in WO 202031096 A.

However, the proposed manufacturing process does not seem to provide fully reproducible pod results mandatory to ensure stable quality and shelf life of the pods.

The present invention proposes to provide a solution to the above-mentioned problem by providing a suitable device and related manufacture process.

SUMMARY OF THE INVENTION

In this respect, the invention provides a manufacturing line for manufacturing a compostable pod for brewing products, said pod being made of two complementary portions. The manufacturing line comprises at least one shaping line for shaping the complementary portions, the shaping line comprising:
  a handling unit for handling the sheet of biodegradable paper-based material with gas barrier biodegradable polymer;
  a humidifying unit for moistening at least one side of the sheet of biodegradable paper-based material;
  an optional pre-drying unit for drying, at least partially, the at least one side of the sheet of biodegradable paper-based material;
  a forming unit for shaping the sheet of biodegradable paper-based material into one of the complementary portions; and
  a drying unit for drying the at least one side of the sheet of biodegradable paper-based material forming one of the complementary portions;

According to the invention, the shaping line comprises at least one humidity sensor for sensing the level of relative humidity of the biodegradable paper-based material forming the pod said at least one humidity sensor being positioned before or after at least said one of the handling unit, the humidifying unit, the optional pre-drying unit, the forming unit and the drying unit.

In particular, the purpose of the present invention is to provide a manufacturing line according to Claim 1 for manufacturing a compostable pod for brewing products, the pod being made of complementary first and second half-shell respectively made from a first and second sheet of biodegradable paper-based material. The claimed manufacturing line comprises a first shaping line for shaping the first half-shell and a second shaping line for shaping the second half-shell, each of the first and second shaping lines comprising:
  a handling unit for handling the sheet of biodegradable paper-based material; the sheet of biodegradable paper-based material being coated on one side, defined as the inner side, with a with gas barrier biodegradable polymer, the other side of the sheet being defined as the external side;
  a humidifying unit for moistening the external side of the sheet of biodegradable paper-based material;
  an optional pre-drying unit for drying, at least partially, the external side of the sheet of biodegradable paper-based material;
  a forming unit for shaping the sheet of biodegradable paper-based material into a half-shell having an internal side corresponding to the internal side of the sheet of biodegradable paper-based material and an external side corresponding to the external side of the sheet of biodegradable paper-based material; and a drying unit for drying the external and/or internal side of the half-shell;

According to the invention, the shaping line comprises at least one humidity sensor for sensing the level of relative humidity of the biodegradable paper-based material forming the pod at the external side of the pod, said at least one humidity sensor being positioned before or after at least said one of the handling unit, the humidifying unit, the optional pre-drying unit, the forming unit and the drying unit.

By sensing the relative humidity of the paper-based material form the pod at different locations and steps of the pod manufacturing, the humidity sensors allow an optimal control of this parameter along the manufacturing line. This is important as the level of humidity in paper packaging may have in impact on the shelf life of the final product, here the pod, and may have an influence on the quality of the product housed by the paper packaging, here the brewing products.

The fact that the pod is made of two similar half-shells results in the duplication of the shaping line.

The manufacturing line may also be designed for forming a pod comprising a half-shell and a lid membrane.

In this case, the invention provides a manufacturing line for manufacturing a compostable pod made of a half-shell and a lid membrane closing the opening of the half-shell, the half-shell and a lid membrane being respectively made from a first and second sheet of biodegradable paper-based material, in which the manufacturing line comprises a shaping line for shaping a half-shell and a lid forming line for forming the lid membrane. The shaping line and the lid manufacturing line comprise:

a handling unit for handling the sheet of biodegradable paper-based material; the sheet of biodegradable paper-based material being coated on one side (B), defined as the inner side, with a with gas barrier biodegradable polymer, the other side (A) of the sheet being defined as the external side;

a humidifying unit for moistening the external side (A) of the sheet of biodegradable paper-based material, the humidifying unit being optional for the lid forming line;

an optional pre-drying unit for drying, at least, and at least partially, the external side (A) of the sheet of biodegradable paper-based material;

a forming unit for shaping the sheet of biodegradable paper-based material into a half-shell or a lid membrane having an internal side (B) corresponding to the internal side (B) of the sheet of biodegradable paper-based material and an external side (A) corresponding to the external side (A) of the sheet of biodegradable paper-based material, the forming unit being optional for the lid forming line; and a drying unit for drying the external side (A) and/or the internal side (B) of the half-shell.

According to the invention the shaping line and/or the lid forming line comprise at least one humidity sensor for sensing the level of relative humidity of the biodegradable paper-based material forming the pod at the external side of the pod, said at least one humidity sensor being positioned before or after at least said one of the handling unit, the humidifying unit, the optional pre-drying unit, the forming unit and the drying unit.

In particular, the at least one humidity sensor is positioned:

After the handling unit and before the humidifying unit, and/or

After the humidifying unit and before the forming unit, and/or

After the forming unit and before the drying unit, and/or

After the drying unit.

This is allows measuring the water content in the biodegradable paper-based material at different location on the manufacturing line to ensure the control of the relative humidity of the paper-based material during the manufacturing process.

In more details, the manufacturing line comprises a control unit receiving the values of relative humidity measured on the external side of the sheet and/or the external side of the half-shell of biodegradable paper-based material measured inline by the at least one humidity sensor.

The advantage of the control unit is that it can regulate the humidity of the biodegradable material to the desired level. Furthermore, the control unit guarantees that the level remains at a constant level, therefore assuring a high process capability.

According to a first possible feature of the manufacturing line, the control unit regulates one or more parameters of the humidifying unit according to the value of relative humidity inline measured by the humidity sensor positioned after the handling unit and before the humidifying unit and optionally in addition by the humidity sensor positioned after the humidifying unit and before the forming unit.

With the information on the values of relative humidity, the humidifying unit can adjust the water content in the bio-degradable paper to the optimal level. Furthermore, this allows to form the bio-degradable paper at the best conditions.

In particular, one parameters of the humidifying unit regulated by the control unit is the amount of liquid used for humidifying the external side of the sheet of biodegradable paper-based material, the amount of liquid being regulated with at least one or more of liquid flow, liquid pressure and humidifying time.

Clearly, the water amount applied to the bio-degradable paper can be regulated through different parameters: Water flow as such, water pressure, water temperature, spraying time of the nozzles, the number of nozzles, the geometrical set up and others. Having the right amount of water in the bio-degradable paper allows to deform the paper in optimal conditions. The regulation may be implemented based on one or more of these parameters according to the needs, which give an important flexibility in the manufacturing process and regulation system of the manufacturing line.

Indeed, applying the desired amount of liquid to the bio-degradable paper assures that the deformation is done under optimal conditions, therefore ensuring paper pods formation without any damages such as cracks, wrinkles or other during the manufacturing.

An additional parameter of the humidifying unit regulated by the control unit is selected in the list of type of liquid, liquid temperature, set up of the humidifying unit or combination thereof which allows optimal flexibility in the regulation.

For instance, for an optimal forming of the pod elements (half-shell, lid membrane) the value of the relative humidity measured on the external side of the sheet of biodegradable paper-based material by the humidity sensor positioned after the humidifying unit and before the forming unit is comprised between 15 and 30%.

The proposed installation allows having a wide range of humidity level thereby ensuring that the line can operate with different versions of bio-degradable paper materials, thereby ensuring the possibility to have paper pods with different properties.

According to a second possible feature of the manufacturing line, the control unit regulates one or more parameters of the drying unit according to the value of relative humidity inline measured by the humidity sensor positioned after the forming unit and before the drying unit and optionally in addition by the humidity sensor positioned after the drying unit. This feature ensures a controlled and accurate drying of the paper material within the manufacturing line according to the requirements.

In particular, one parameters of the drying unit regulated by the control unit is the selected within the list comprising the volume of the airflow, the temperature of the airflow, the dryness of the air, the exposure time of the half-shell to the airflow.

Being capable to dry different levels of humidity allows humidifying the bio-degradable paper to the humidity level which is optimal for the deforming process thereby obtaining products with improved quality.

The drying parameters are, for example, the volume of airflow, temperature of airflow, dryness of air, exposure time of the bio-degradable paper to the air, geometrical set up.

In fact, having different parameter to dry the bio-degradable paper to the desired level of dryness, allows to work with different humidity levels, with different bio-degradable paper types, and allows to reduce energy consumption to a minimum.

For instance, for an optimal forming of the pod elements (half-shell, lid membrane), the value of the relative humidity measured on the external side of the half-shell of biodegradable paper-based material by the humidity sensor (S4) positioned after the drying unit is less than 6%.

Indeed, having dry capsules is mandatory to comply with alimentary requirements and additionally, the consumer is also expecting a dry product. Wet capsules would possibly stimulate microorganism growth on coffee pods and lower down the shelf life of the product.

According to a second possible feature of the manufacturing line, the control unit regulates one or more parameters of the forming unit according to the value of relative humidity inline measured by the humidity sensor positioned after the humidifying unit and before the forming unit.

In fact, knowing the humidity level of the bio-degradable paper allows optimal regulation of the parameter of the forming tool, with the objective to deform the paper under optimal conditions. Some of the parameter that can be regulated in the forming tool are the temperature of the forming die and the plunger, speed of the plunger, fixing force for the paper (squeezing force upper and lower part of the forming tool), cycle time of the forming process.

As mentioned, the shaping line of the manufacturing line may comprise a pre-drying unit. As a possible option, the control unit may regulate one or more parameters of the pre-drying unit according to the value of relative humidity inline measured by the humidity sensor (S1) positioned after the handling unit before the pre-drying unit.

This is an advantage in that the pre-drying unit allows having much more flexibility in the forming process. E.g., if the paper should be too wet, it can be re-dried and the requested humidity level in the forming unit can be guaranteed. It also helps to assure that the bio-degradable paper has the same humidity level across the section.

According to a further feature, the manufacturing line comprises:

a filling unit for filling the half-shell with a determined quantity of brewing product;
a pressing unit for compacting the brewing product within the half-shell:
a sealing unit, the sealing unit receiving the complementary half-shell and sealing the two half-shell together; and
an cutting unit.

The invention further relates a system for measuring and regulation the relative humidity of the biodegradable paper-based material forming the complementary portions of the pod.

Hence, according to another aspect of the invention, a system for measuring and regulating the relative humidity of a sheet of biodegradable paper-based material according to Claim 15 is proposed. The system comprises:

an in-line humidifying unit for moistening the external side of the sheet of biodegradable paper-based material to be shaped into a half-shell;
an in-line drying unit for drying the external side of the half-shell made from the sheet of biodegradable paper-based material;
an in-line humidity measuring system measuring the relative humidity of the external side of the sheet of biodegradable paper-based material and/or the external side of the half-shell made from the sheet of biodegradable paper-based material;
an in-line humidity regulating system;

More particularly, the in-line humidity regulating system regulates the moistening of the external side of the sheet of biodegradable paper-based material by regulating the in-line humidifying unit and/or the drying of the half-shell made from the sheet of biodegradable paper-based material by regulating the in-line drying unit based on the in-line humidity measuring system.

As an advantage, the various closed loop control cycles allow to deform bio-degradable paper under optimal conditions. The closed loop control cycles apply on a continuous basis so that it is possible to continuously proceed with the manufacturing line and process in optimal conditions.

As a further proposal, the in-line humidity regulating system regulates the moistening of the external side of the sheet of biodegradable paper-based material by regulating the temperature of the forming unit.

In a similar way, regulating the temperature of the forming unit has the advantage that the deformation of the bio-degradable paper can be done under optimal conditions ensuring paper pods complying with quality requirements.

In particular, the in-line humidity measuring system comprises at least one humidity sensor for sensing the level of relative humidity of the external side of the sheet of biodegradable paper-based material and/or the external side of the half-shell made from the sheet of biodegradable paper-based material.

The advantage of measuring the humidity levels at various stages of the process ensures that the different units across the manufacturing line, humidifying unit and forming unit operate at optimal conditions, for assuring quality-conform paper-pods.

According to a further aspect, the invention relates to a manufacturing process comprising the steps of measuring the relative humidity of at least one side of the sheet (3) of biodegradable paper-based material forming one of the complementary portions (4a, 4b, 6) of the pod (5) and regulating different steps of this process according the relative humidity measured in one or more of the shaping steps.

To the end, a method for manufacturing a compostable pod for brewing products made of biodegradable paper-based material having gas barrier properties according to claim 18 is proposed.

The method of manufacturing comprises the following steps:
preparing a first and a second sheet of biodegradable paper-based material;
shaping said first sheet into at least a first half-shell;
shaping said second sheet into a second half-shell;
filling the first half-shell with a predetermined quantity of brewing product;
compacting the predetermined quantity of brewing product within the first half-shell
joining said first half-shell to said second half-shell so as to form a pod housing said brewing product;
The shaping steps of the first and of the second sheet of paper-based biodegradable material into the first and second half-shell of the claimed manufacturing method comprises the steps of:
moistening at least a first portion of said first sheet and a second portion of said second sheet;
measuring the relative humidity of the first portion of the first sheet and the second portion of the second sheet
forming said first and said second portion so as to make said first and said second half-shell;
drying said the first and said second half-shell.
measuring the relative humidity of the first and second half-shelf; and
regulating the moistening step and/or the forming step and/or the drying step according the relative humidity measured in one or more step of the shaping steps The proposed manufacturing method allows having a stable production process with optimal quality of the produced pods.

According to an additional aspect of the invention, the proposed manufacturing line using a system for measuring and regulating the relative humidity of a biodegradable paper-based material used for manufacturing a compostable pod using the proposed method for manufacturing a compostable pod allows the use of a compostable pod made from a biodegradable paper-based material as claimed in claim 19.

BRIEF DESCRIPTION OF THE DRAWINGS

The invention is further described with reference to the following examples. It will be appreciated that the invention as claimed is not intended to be limited in any way by these examples.

Embodiments of the present invention will now be described, by way of examples, with reference to the accompanying figures in which.

DETAILED DESCRIPTION

As used in this disclosure and the appended claims, the singular forms "a," "an" and "the" include plural referents unless the context clearly dictates otherwise. Thus, for example, reference to "a fluid" or "the fluid" includes two or more fluids.

The words "comprise," "comprises" and "comprising" are to be interpreted inclusively rather than exclusively. Likewise, the terms "include," "including" and "or" should all be construed to be inclusive, unless such a construction is clearly prohibited from the context.

Nevertheless, the devices and apparatuses disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified.

The term "and/or" used in the context of "X and/or Y" should be interpreted as "X," or "Y," or "X and Y." Similarly, "at least one of X or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

Numerical adjectives, such as "first" and "second," are merely used to distinguish components. These numerical adjectives do not imply the presence of other components, a relative positioning, or any chronological implementation. In this regard, the presence of a "second" structure does not imply that a "first" structure is necessarily present. Further in this regard, a "second" element can be obtained and/or used before, after, or simultaneously with any "first" element.

Any reference to prior art documents in this specification is not to be considered as an admission that such prior art is widely known or forms part of the common general knowledge in the field.

Figure 1A:
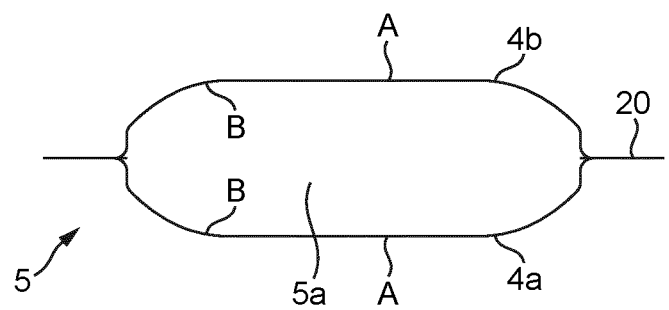
FIG. 1a is a schematic cross-section view of compostable pod according to the present invention.

FIG. 1a represents a schematic cross-section view of a compostable paper pod 5 made according to the invention.

The pod 5 is made of two half-shells 4a and 4b sealed together and enclosing a predetermined quantity of brewing products 5a. The brewing products may be, for example, coffee, tea or another ingredient or a mix of ingredients used for preparing a beverage in a beverage preparation machine. Each one of the half-shells comprise a rim 20 allowing proper sealing and a better handling of the pod by the consumer. The pod 5 is generally maintained in the beverage preparation machine using the rim 20.

Each half-shell, 4a and 4b is made of a sheet 3a, respectively 3b of biodegradable paper-based material having gas barrier properties.

Hence, the half-shell 4 (either 4a or 4b) is made from a sheet 3 (either 3a or 3b) of biodegradable paper-based material having gas barrier properties through a specific forming process that will be discussed later in the description.

The gas barrier properties are obtained thanks to a coating applied on at least one side of the paper material.

The coating is essentially made of a bio-polymer, for example, PBAT, PBS or PLA. By bio-polymer it is intended a biodegradable and/or compostable polymer. The bio-polymer could be home and/or industrially compostable according to the current ongoing regulations.

In more details, the term "compostable" means that the material is substantially broken down within a few months or weeks. It can be home compostable or industrially compostable. When it is industrially composted, the material is at least about 90% composted under specific conditions within six months as determined by the method of ISO14855 or EN13432.

The polymer may even be bio-based, i.e. made from non-petroleum-based materials (monomers).

The paper material is a parchment paper with a specific treatment allowing formability.

In the present case, the paper-based material is coated on one side with a bio-polymer having gas barrier properties, as the ones above mentioned as example. The paper is initially in the form of a paper sheet that has two sides. Side A is defined as the external side and side B is defined as the internal side.

The bio-polymer is applied on side B that is the internal side that will form at the end of the manufacturing process the interior housing of the pod 5. Hence the bio-polymer is in contact with the brewing products.

These internal and external side definition, A and B, will be used also for the half-shell 4 and the pod 5 along the description. The internal sides B of the half-shells 4a, 4b and pod 5 are the sides that will form the housing for the brewing products. The external sides A of half-shell 4 and pod 5 are the sides facing the outside of the pod.

Along this application, the biodegradable paper-based material is intended as encompassing a paper material on which is applied a bio-polymer having gas barrier properties. The biodegradable paper-based material that is current used is from the company AHLSTROM MUNKJÖ.

The biodegradable paper-based material is presented as a sheet of biodegradable paper-based material on a roller.

To ease reading, the term paper will be used to designate the biodegradable paper-based material in the current description.

Figure 1B:
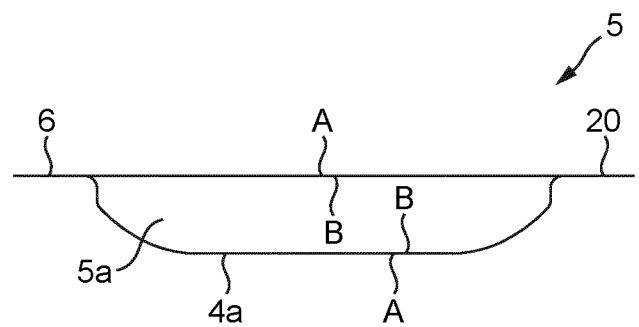
FIG. 1b is a schematic cross-section view of compostable pod according to a second embodiment the present invention.

FIG. 1b represents a schematic view of a compostable paper pod 5 made according to another embodiment of the present invention. Here, the pod 5 comprises one half-shell 4 and one flat membrane 6 that is sealed on the half-shell 4. As above presented both parts of the pod 5 are made of a biodegradable paper-based material. On paper sheet 3a is shaped as a half-shell 4 and the other paper sheet 3b is forming a membrane for covering the opening of the half-shell 4. The membrane is generally flat or undulated and may need to be shaped. In some cases, the membrane 6 may not be shaped and the paper sheet is used directly (without prior forming) after a preparation process if needed, for example humidifying and/or precutting.

Figure 2:
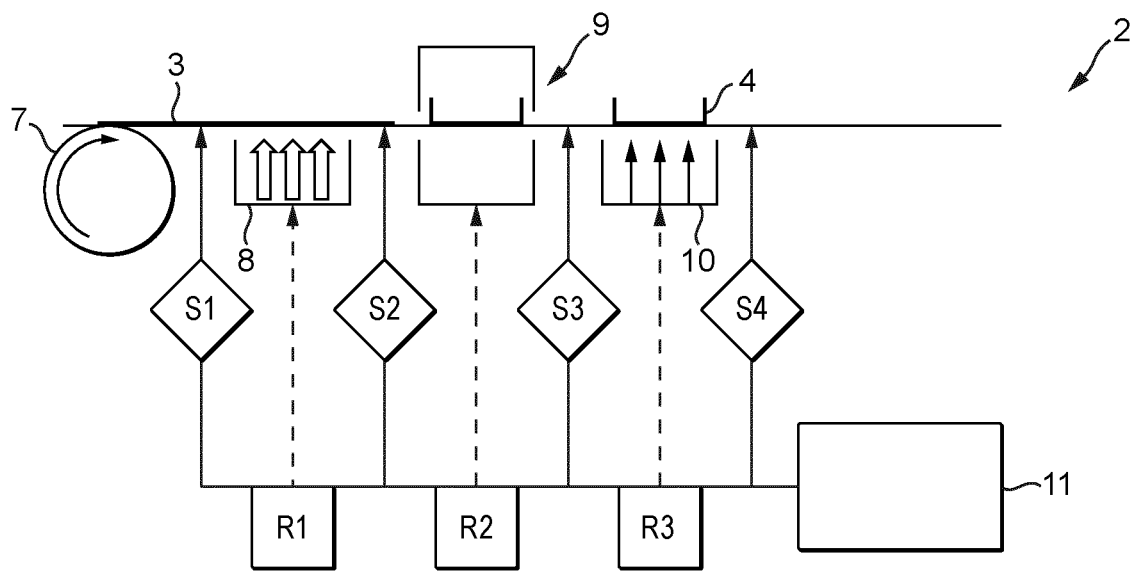
FIG. 2 a shaping line of a packaging manufacturing line of a compostable pod for brewing products according to the present invention.

FIG. 2 represents a shaping line 2 for a half-shell 4 (either 4a or 4b, the shaping lines being similar) made of biodegradable paper-based material, part of a compostable pod 5 manufacturing line 1 that will further be described in detail. The manufacturing line 1 and shaping line 2 are both conceived as compliant with alimentary regulations in production.

The shaping line 2 comprises at its entrance a handling unit 7 for storing and unrolling the paper. At the handling unit 7, the paper is unwound and provided for further processing along the line. The paper may remain as part of the paper roller or may be cut into portions. In both case, the wording sheet of paper . . . will be used.

Before being inserted in the handling unit 7, the paper rolls may be stored in an area with controlled humidity.

Once unwound, the paper is inserted into and proceed in a humidifying unit 8.

The humidifying unit 8 aims at moistening at least one side of the paper. In practice, the side that is moisten is the external side A, the side that does not comprise the bio-polymer.

The words "moistening" and "humidifying" are here given the same meaning and will be indifferently both used.

The humidifying unit 8 humidifies the paper by spraying a liquid over the paper. The spraying arrangement of the humidifying unit uses, for example, spraying nozzles.

The present embodiment proposes the use of spraying elements in the humidifying unit 8 to humidify the paper, however, other type of humidification devices may be used. For example, applicator rollers using for example brushes or sponges.

The liquid is alimentary conform and fully safe in connection with human consumption.

This liquid is a water-based liquid (water with one or more additional element that may improve formability) or water.

The water that is used may be water from the commune with a specific UV treatment or demineralized coming from a reverse osmosis process. The main point is to have a water that fully complies with alimentary requirements.

The amount of water which is applied to the paper is in-line regulated according to different parameter that will influence the level of relative humidity of the paper.

The amount of water can be regulated by one of more of the following parameters:
water flow,
water pressure,
water temperature that can vary from 20 to 80° C.,
spraying time of the nozzles,
number of active nozzles,
geometrical set up of the nozzles, As an example, the spraying nozzles arrangement may comprise 4 nozzles for spraying an amount of water between 10 and 70 gr/m2 of paper.

The nozzles may be made of stainless steel and alimentary sealing material (for ex.: alimentary PTFE).

When exiting the humidifying unit 8, the relative humidity of the paper should be comprised between 15 and 30% in order to be properly shaped and to avoid cracks, wrinkles or any other appearance defects on the half-shell to be formed and its rim.

Once the sheet 3 of paper is moisten on its external side A, the paper enters a forming unit 9 for shaping the sheet of paper into the desired shape. In the present case, the desired shape may be a half-shell 4.

The forming unit 9 comprises a plunger and a cavity (not represented), in between which the paper sheet 3 is positioned.

The forming process can be split into several steps.

The forming unit may comprise:
- a cutting area for cutting the paper sheet I at specific locations to release stresses applying on the paper sheet during shaping of the half-shell and after the shaping and
- a stamping area for shaping (a portion of) the paper sheet into a half-shell For example, before undergoing the specific shaping, the paper sheet 3 may be precut at different locations (on the paper sheet) to lower down the stresses possibly applying once the half-shell 4 is formed. The pre-cut of the paper may have different shape and/or length according to the characteristics of the paper that is used. The precut unit is not presented in the figures.

Indeed, the paper sheet 3, according to its dimensions, may allow forming a certain number of half-shells 4.

After an optional precut of the paper sheet 3, the paper sheet 3 is positioned between the plunger and the cavity which are then toward The forming process is regulated by various parameters that may be combined when possible or needed, such as:
- the shape of the cavity and plunger,
- the material of the cavity and plunger (surface roughness, material, friction, coating of the die and/plunger, etc.),
- the speed of the movements,
- the clamping force applied on the paper allowing to crush wrinkles appearing during forming,
- vacuum on the cavity side,
- humidity level of the paper (relative humidity),
- paper composition and properties, etc.

At the end of the forming unit 9, the sheet of paper 3 is shaped in a series of half-shell 4.

The half-shell 4 is then dried to ensure a stable process and the supply of a repeatable product.

A drying unit 10 is completing the shaping line 2.

The drying unit 10 dries the paper to the desired level by, for example, blowing air over the paper.

When the drying of the paper (in the form of a half-shell) is made by blowing air, the drying of the paper can be regulated by one of more of the following parameters:
- volume air flow,
- temperature of the airflow,
- dryness of the air,
- exposure time of the paper to the air,
- geometrical set up,
- etc.

when regulating the drying of the paper based on the above-mentioned parameters, the relative humidity of the air should be taken into account and the parameters adapted if the relative humidity of the air increases.

As an example, the proposed drying unit makes use of a total air flow between 2 500 and 3 000 m3/hour and the air that is blown has a temperature ranging approximately from 20° to 40° C.

Alternative drying system may be used without departing from the disclosed technical solution. For example, a drying unit using heating means that dries the paper by closed contact may be used.

At the end of the drying process, when the half-shell exits the drying unit, the relative humidity of the paper forming the half-shell should not be higher than 5%.

An adapted hygienic design ensures that alimentary requirements are fully respected. For example, the air that is blown onto the shaped paper (half-shell) or onto the membrane should be free of any contaminant. In order to reduce the risk of development of microorganisms, the relative humidity of the air should be in the range of 30 to 70%.

The shaping line 2 also comprises a series of sensors, S1, S2, S3 and S4. These sensors are humidity sensors allowing the detection of the relative humidity of the paper material, either when it is a sheet 3 or when it is shaped as a half-shell 4 or a membrane 6.

Sensors S1, S2, S3 and S4 measure inline the relative humidity of the paper on it external side (side A). The measured values serve to control the whole process and in particular they serve to regulate the humidifying unit 8, the forming unit 9 and the drying unit 10.

As can be seen in FIG. 2, sensor S1 is positioned after the handling unit and before the humidifying unit, sensor S2 is positioned after the humidifying unit and before the forming unit, sensor S3 is positioned after the forming unit and before the drying unit, and sensor S4 is positioned after the drying unit.

Hence, S1 records the relative humidity (RH) of the incoming paper once handled by the handling unit 7.

S2 records the RH of the paper after the humidifying unit, the RH at this stage of the process and in order to ensure a good and correct forming of the half-shell should be comprised between 15 and 30%.

S3 records the RH of the paper after the forming unit.

S4 records the RH of the paper after the drying unit, the RH at this stage of the process and in order to ensure a stable storage and acceptable shelf life of the pod 5 (once formed and housing brewing products) should be less than 6%, generally between 2 and 6%.

One type of sensors that may be used is using a microwave system.

The sensor measuring principle uses the microwave radiographic method: An electromagnetic field is applied which makes the water molecules to rotate (water molecules activated by microwaves). The dielectric losses are measured, and the loss of energy is an indication of the water content in the paper.

Other type of sensors know from the skilled person may be used.

In the proposed line, all the sensors S1, S2, S3 and S4 are connected to a control unit 11 that analyses the sensed relative humidity at the different units location of the shaping unit and continuously regulates the different parameters of one or more of the humidifying unit, the forming unit and the drying unit. The regulation may be made using regulation modules.

- Module R1 regulates the parameters of the humidifying unit. The main parameters used for the regulation are the amount of water, the temperature, the time and the pressure of the water that is applied.
- Module R2 regulates the parameters of the forming unit. The main parameter used for the regulation is the temperature of one or more of the cavity and plunger. And the speed of the movements and the clamping force.
- Module R3 regulates the parameters of the drying unit. The main parameters used for the regulation are the amount of air blown, the temperature of the air, the dryness (relative humidity) of the entering air, and the time the air is blown onto the paper.

This inline humidity measuring and regulation of the relative humidity of the paper (in form of a sheet or shaped in a half-shell or as a membrane) with a continuous closed loop-control system is particularly efficient to ensure a regular quality of the pods that are manufactured.

In one embodiment, the amount of water which is applied to the paper by the humidifying unit is in-line regulated according to the relative humidity values measure by S1 and S2 and the amount of air blown onto the paper by the drying unit is in-line regulated according the relative humidity values measured by S3 and S4.

The humidity regulating loops use two basic regulation loops continuously applying on the humidifying unit (and related process) and on the drying unit (and related process).

The humidifying process maybe regulated as follows:

Sensors S1 and S2 inline measure the humidity of the paper before and after the humidifying unit 8 respectively.

If the value measure by S2 is lower than set point (15-30% RH):
  a. increase the water flow,
  b. increase the time of 'nozzles open'
If the value measured by S2 is higher than set point (15-30% RH):
  a. decrease the water flow,
  b. decrease the time 'nozzles open'

The values of decrease or increase of the above parameters are taking into account the value of RH measured by S1 and adapting them in a continuous regulation loop.

The drying process is regulated as follows:

Sensors S3 and S4 inline measure the relative humidity of the paper before and after the drying unit 10 respectively.

If the value measured by S4 is lower than set point (2-6% RH):
  a. decrease the air flow,
  b. decrease the air temperature
If the value measured by S4 is higher than set point (2-6% RH):
  a. increase the air flow,
  b. increase the air temperature The values of the decrease or increase of the above parameters are taking into account the value of RH measured by S3 and adapting them in a continuous regulation loop.

Additional parameters may also be regulated in addition to the above mentioned one in order to accelerate reaching the set point of RH before the forming unit 9 and after the drying unit 10.

For example, the temperature of the water used for humidifying the paper and the temperature of the forming tool (cavity and plunger) at the forming unit may be regulated.

Forming tool: The temperature of the forming tool may be regulated between 20° C. and 120° C.

Water spayed onto the paper at the humidifying unit: The temperature may be regulated between 20 and 80° C.

The temperature difference of the water at the humidifying unit and the temperature of the forming tool should be controlled in order to avoid thermal reactions on the paper. The maximum difference should be approximately 40° C., for example, forming tool at 100° C. and water (humidifying unit) at 60° C.

Figure 3:
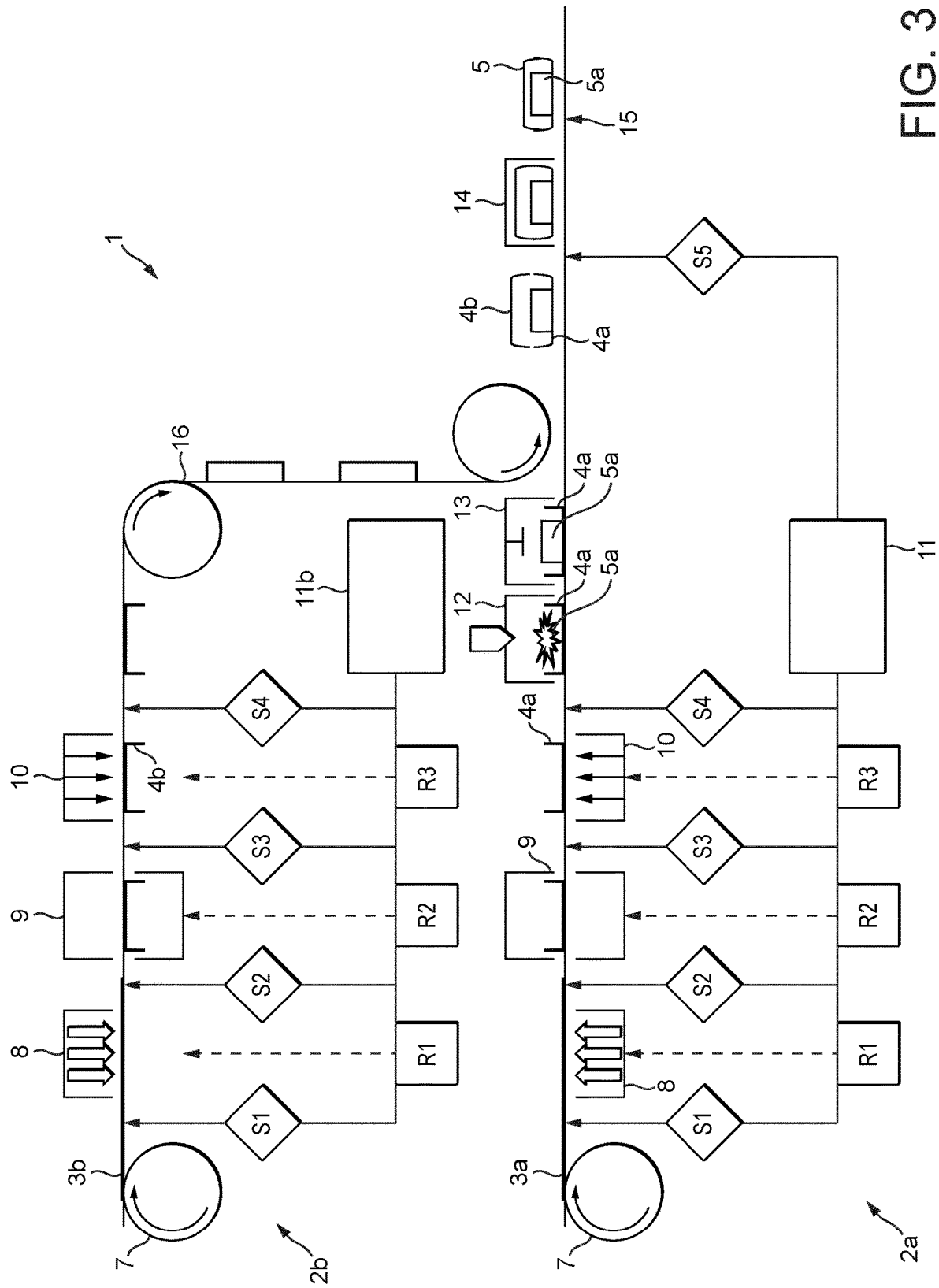
FIG. 3 is a schematic view of a packaging manufacturing line of a compostable pod for brewing products according to the present invention integrating the shaping line of FIG. 2.

FIG. 3 represent a schematic view of a packaging manufacturing line 1 for the proposed compostable pod 5 according to the present invention integrating the shaping line of FIG. 2.

The packaging manufacturing line 1 comprises a shaping line 2a similar to the shaping line described in FIG. 2, forming as represented in the figure a bottom half-shell of biodegradable paper-based material. The manufacturing line 1 also comprises a second shaping line 2b similar to the shaping line described in FIG. 2, forming as represented in the figure a top half-shell of biodegradable paper-based material.

Hence the shaping line 2a is shaping from a paper sheet 3a, a half-shell 4a positioned as a pod bottom portion. In addition to the handling unit 7, the humidifying unit 8 and drying unit 9 and on control unit 11 described in connection with FIG. 2, along with the measuring and regulation system, it comprises a filling unit 12, a pressing unit 13.

The filling unit 12, once the half-shell in the right position inside the filling unit, fills a brewing products 5a into the bottom half-shell 4a. The filling unit may use an endless screw for delivering the predetermined quantity of brewing products. The filling unit 12 should accurately deliver the brewing product so that no brewing product is spread on the rim 20 of the half-shell 4. The skilled person may use other type of know fillers in order to achieve the same result.

The pressing station 13 for compacting the brewing product 5a inside the bottom half-shell 4a. The compaction force and duration are adapted to the compacting desired result. Ideally the brewing product should be compacted so as to avoid any particle of the brewing products to disperse within the bottom half-shell 4a or on the rim 20. The compacted brewing products is fully participating to the integrity of the pod 5. As an example, the brewing products should be compacted enough so that the pod 5 cannot be folded. Adequate design of the pressing station 13 is known to the skilled person.

The shaping line 2b, similar to the shaping line 2 described in connection with FIG. 2, is shaping, from a paper sheet 3b, a half-shell 4b positioned as a pod top portion. The shaping line 2b comprises, in addition to the handling unit 7, the humidifying unit 8, drying unit 10 and on control unit 11b, a conveying line 16 to convey the half-shell 4b forming the pod top portion to the shaping line 2a at a location positioned after the pressing station 13.

After the joining of both shaping lines 2a and 2b at a common point where the half-shell 4b (forming the top portion of the pod) joins is positioned on top of the half-shell 4a (forming the bottom portion of the pod), the manufacturing line 1 comprises a sealing station 14.

The sealing unit 14 performs the sealing of the two half-shells 4a and 4b together thereby forming a closed cavity for the brewing products.

The sealing is made at the location of the rim of both half-shells thanks to the bio-polymer using thermo-sealing or ultrasonic sealing technologies.

Before the sealing unit, a sensor S5 is provided for measuring the relative humidity of the half-shell 4a forming the bottom portion of the pod. Sensor S5 is connected to the control unit 11 and allows further regulation of the relative humidity of the paper through regulation modules R1, R2 or R3 depending on the RH measured value.

A final cutting unit 15 is present at the end of the manufacturing line to individualize the pods 5 by cutting concentrically the pods around the rim 20.

The manufacturing line 1 may further comprise an end of line unit (not represented) for collecting and packaging the pods 5.

In the proposed manufacturing line sensors S1, S2, S3, S4 and S5 measure inline the relative humidity of the paper (external side as defined). These values serve to control the whole process and to regulate the humidifying unit 8, the forming unit 9 and the drying unit 10.

At all units of the manufacturing line 1 proper hygienic design is applied and serves to comply with any alimentary requirements (food safety).

In another embodiment of the manufacturing line 1, the manufacturing line comprises a shaping line 2 for shaping a half-shell forming the bottom portion of a pod and filled with brewing products and a lid forming line for forming a lid membrane for the half-shell. The lid forming line comprises the same handling unit and drying unit as the shaping line 2. The lid forming line may further comprise a humidifying line if stretching of the paper material is needed for forming the membrane. The forming unit is optional as the lid membrane is a flat portion of the biodegradable paper-based material above described in connection with FIGS. 1a and 1b.

The other units of the manufacturing line are similar. The pod 5 thus formed is the pod presented in FIG. 1b.

Figure 4:
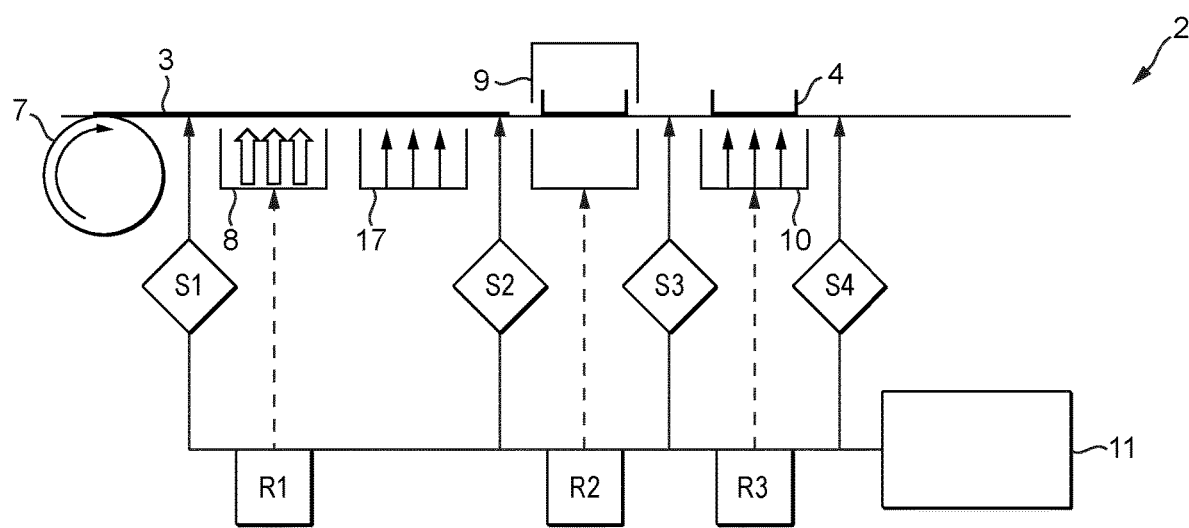
FIG. 4 is a schematic view of a shaping line according to another embodiment of the invention integrating a pre-drying unit.

FIG. 4 represents a schematic view of the shaping line 2 described in connection with FIG. 2 integrating a pre-drying unit 17 positioned after the humidifying unit 8. The pre-drying unit 17 has the same functionality as the drying unit 10 as previously described. In some specific cases, a pre-drying unit 17 may be needed to better control the relative humidity of the paper before the shaping of the paper in the forming unit 9. The pre-drying may be done on both side of the paper if needed.

As an option, that is not represented, the drying unit 10 may be combined within the forming unit 8 so has to form a single entity. The humidity sensors may be reorganized as needed.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. Manufacturing line for manufacturing a compostable pod for brewing products, said pod being made of complementary first and second half-shell respectively made from a first and second sheet of biodegradable paper-based material, said manufacturing line comprising a first shaping line for shaping the first half-shell and a second shaping line for shaping the second half-shell, each of the first and second shaping lines comprising:
   a handling unit for handling the sheet of biodegradable paper-based material; the sheet of biodegradable paper-based material being coated on one side (B), defined as the inner side, with a gas barrier biodegradable polymer, the other side (A) of the sheet being defined as the external side;
   a humidifying unit for moistening the external side (A) of the sheet of biodegradable paper-based material;
   a forming unit for shaping the sheet of biodegradable paper-based material into a half-shell having an internal side (B) corresponding to the internal side (B) of the sheet of biodegradable paper-based material and an external side (A) corresponding to the external side (A) of the sheet of biodegradable paper-based material;
   a drying unit for drying the external side (A) and/or the internal side (B) of the half-shell; and
   the shaping line comprises at least one humidity sensor for sensing the level of relative humidity of the biodegradable paper-based material forming the pod at the external side (A) of the pod, said at least one humidity sensor being positioned before or after at least said one of the handling unit, the humidifying unit.

2. Manufacturing line according to claim 1 wherein the at least one humidity sensor is positioned in a location selected from the group consisting of:
   After the handling unit and before the humidifying unit
   After the humidifying unit and before the forming unit,
   After the forming unit and before the drying unit,
   After the drying unit.

3. Manufacturing line according to claim 1, wherein a control unit receiving the values of relative humidity measured on the external side (A) of the sheet and the external side (A) of the half-shell or lid membrane of biodegradable paper-based material measured inline by the at least one humidity sensor.

4. Manufacturing line according to claim 3, wherein the control unit regulates one or more parameters of the humidifying unit according to the value of relative humidity inline measured by the humidity sensor positioned after the handling unit and before the humidifying unit.

5. Manufacturing line according to claim 3, wherein the control unit regulates one or more parameters of the drying unit according to the value of relative humidity inline measured by the humidity sensor positioned after the forming unit and before the drying unit.

6. Manufacturing line according to claim 3, wherein the control unit regulates one or more parameters of the forming unit according to the value of relative humidity inline measured by the humidity sensor positioned after the humidifying unit and before the forming unit.

7. Manufacturing line according to claim 3, wherein the control unit regulates one or more parameters of the pre-drying unit according to the value of relative humidity inline measured by the humidity sensor positioned after the handling unit before the pre-drying unit.

8. Manufacturing line according to claim 1, wherein the manufacturing line further comprises
   a filling unit for filling the half-shell with a determined quantity of brewing product;
   a pressing unit for compacting the brewing product within the half-shell;
   a sealing unit, the sealing unit receiving the complementary half-shell or lid membrane and sealing together the first half-shell to the second half-shell or lid membrane; and
   a cutting unit.

9. Manufacturing line for manufacturing a compostable pod for brewing products, said pod being made of a half-shell and a lid membrane closing the opening of the half-shell, the half-shell and a lid membrane being respectively made from a first and second sheet of biodegradable paper-based material, said manufacturing line comprising a shaping line for shaping a half-shell and a lid forming line for forming the lid membrane, the shaping line and the lid manufacturing line comprising:
   a handling unit for handling the sheet of biodegradable paper-based material; the sheet of biodegradable paper-based material being coated on one side (B), defined as the inner side, with a gas barrier biodegradable polymer, the other side (A) of the sheet being defined as the external side;
   a humidifying unit for moistening the external side (A) of the sheet of biodegradable paper-based material, the humidifying unit; line;
   a forming unit for shaping the sheet of biodegradable paper-based material into a half-shell or a lid membrane having an internal side (B) corresponding to the internal side (B) of the sheet of biodegradable paper-based material and an external side (A) corresponding to the external side (A) of the sheet of biodegradable paper-based material; and
   a drying unit for drying the external side (A) and/or internal side (B) of the half-shell; and
   the shaping line and/or the lid forming line comprise at least one humidity sensor for sensing the level of relative humidity of the biodegradable paper-based material forming the pod at the external side (A) of the pod, said at least one humidity sensor being positioned before or after at least said one of the handling unit, the humidifying unit.

10. Manufacturing line according to claim 9, wherein the at least one humidity sensor is positioned in a location selected from the group consisting of:
After the handling unit and before the humidifying unit,
After the humidifying unit and before the forming unit,
After the forming unit and before the drying unit, and
After the drying unit.

11. Manufacturing line according to claim 9, wherein a control unit receiving the values of relative humidity measured on the external side (A) of the sheet and the external side (A) of the half-shell or lid membrane of biodegradable paper-based material measured inline by the at least one humidity sensor.

12. Manufacturing line according to claim 11, wherein the control unit regulates one or more parameters of the humidifying unit according to the value of relative humidity inline measured by the humidity sensor positioned after the handling unit and before the humidifying unit.

13. Manufacturing line according to claim 11, wherein the control unit regulates one or more parameters of the drying unit according to the value of relative humidity inline measured by the humidity sensor positioned after the forming unit and before the drying unit.

14. Manufacturing line according to claim 11, wherein the control unit regulates one or more parameters of the forming unit according to the value of relative humidity inline measured by the humidity sensor positioned after the humidifying unit and before the forming unit.

15. Manufacturing line according to claim 11, wherein the control unit regulates one or more parameters of the pre-drying unit according to the value of relative humidity inline measured by the humidity sensor positioned after the handling unit before the pre-drying unit.

16. Manufacturing line according to claim 9, wherein the manufacturing line further comprises
a filling unit for filling the half-shell with a determined quantity of brewing product;
a pressing unit for compacting the brewing product within the half-shell:
a sealing unit, the sealing unit receiving the complementary half-shell or lid membrane and sealing together the first half-shell to the second half-shell or lid membrane; and
a cutting unit.

17. A system for measuring and regulating the relative humidity of a biodegradable paper-based material used for manufacturing a compostable pod comprising:
an in-line humidifying unit for moistening the external side (A) of the sheet of biodegradable paper-based material to be shaped into a half-shell;
an in-line drying unit for drying the external side (A) of the half-shell made from the sheet of biodegradable paper-based material;
an in-line humidity measuring system measuring the relative humidity of the external side (A) of the sheet of biodegradable paper-based material and/or the external side (A) of the half-shell made from the sheet of biodegradable paper-based material;
an in-line humidity regulating system; and
the in-line humidity regulating system regulates the moistening of the external side (A) of the sheet of biodegradable paper-based material by regulating the in-line humidifying unit and/or the drying of the half-shell made from the sheet of biodegradable paper-based material by regulating the in-line drying unit based on the in-line humidity measuring system.

18. The system according to claim 17, wherein the in-line humidity regulating system regulates the moistening of the external side (A) of the sheet of biodegradable paper-based material by regulating the temperature of the forming unit.

19. The system according to claim 17, wherein the in-line humidity measuring system comprises at least one humidity sensor for sensing the level of relative humidity of the external side (A) of the sheet of biodegradable paper-based material and/or the external side (A) of the half-shell made from the sheet of biodegradable paper-based material.

* * * * *